April 12, 1966 W. K. BOETTINGER 3,246,093
HIGH ALTITUDE BAROMETRIC PRESSURE SWITCH
Filed Oct. 29, 1963
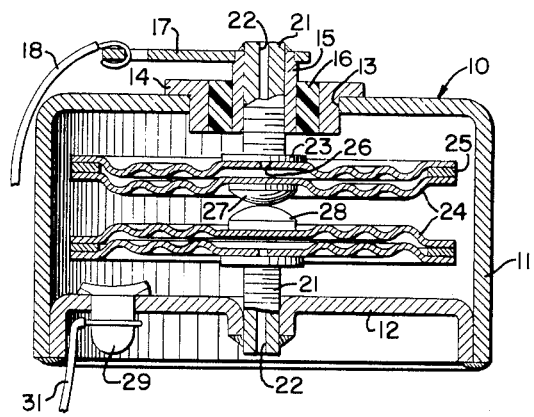
INVENTOR
WILLIAM K. BOETTINGER
BY
ATTORNEY United States Patent Office 3,246,093
Patented Apr. 12, 1966

3,246,093
HIGH ALTITUDE BAROMETRIC PRESSURE SWITCH
William K. Boettinger, Baltimore, Md., assignor, by mesne assignments, to the United States of America as represented by the Secretary of the Navy
Filed Oct. 29, 1963, Ser. No. 319,904
1 Claim. (Cl. 200—83)

This invention relates to pressure-responsive switching devices and more particularly to a modular barometric pressure switch for use with a high altitude rocket or the like having a pair of normally closed contacts which are opened by a reduction of external fluid pressure applied thereto when the switch has been carried to a predetermined high altitude and which are again closed when the switch reaches this altitude on its return to earth.

The device of the present invention is well suited for use with apparatus carried by a high altitude rocket for obtaining barometric pressure data during the descent of the rocket from its maximum altitude when the rocket enters a predetermined pressure zone during the descent thereof. The apparatus comprises a radio transmitter carried by the rocket which is set into operation as a parachute connected thereto opens whereby a radio signal is transmitted to a ground station as the rocket descends, the signal being modulated by certain weather sensing devices responsive to temperature, barometric pressure and the like. When the pressure on the device has increased to a predetermined value such, for example, as that corresponding to an altitude of 70,000-80,000 feet above the surface of the earth the contacts are closed thereby causing the radio transmitter to transmit a signal indicative of this condition and concurrently therewith to connect a barometric responsive device to the transmitter for continuously transmitting to the ground station signals correlative with the instant position of the device during the descent thereof to earth. By employing radar techniques the altitude of the device above the surface of the earth may be ascertained with a considerable degree of accuracy thereby to establish a base line for the subsequent calculation of the increase of barometric pressure encountered by the rocket during a subsequent portion of the trajectory thereof. Provision may be made, as desired, for recording this variation in pressure while the switch contacts are closed.

In prior devices of this character considerable trouble has been experienced at the contacting surface of the contacts as a result of deterioration thereof during long periods of storage such that the contacts at times may fail to establish an electrical circuit therethrough as the contacts are brought to circuit closing position during the downward movement of the rocket. The device of the present invention does not possess this disadvantage for the reason that the contacts are hermetically sealed from the ambient atmosphere by an enclosed casing having a high degree of vacuum therein. Furthermore the contacts and actuating bellows therefor are so constructed and arranged that they will successfully withstand the high acceleration forces of several hundred G corresponding to the initiation of the rocket motor and the space expulsion shock respectively as the rocket is launched without permanent deformation thereof or impairment of the sensitiveness and accuracy of the device.

One of the objects of the present invention is to provide a new and improved barometric pressure switch for use with a high altitude rocket which will successfully withstand the high stock loads of rocket launching without impairment of the sensitivity and accuracy thereof.

Another of the objects is to provide a new and improved modular unit barometric pressure switch having a pair of normally closed contacts in which means are provided for preventing deterioration of the contacts during long periods of storage.

A further object is to provide a new and improved barometric pressure switch having a minimum sensing volume to provide rapid response to pressure changes and which is suitable for potting in nested arrangement with a plurality of like switches in such manner that the switches will bottom-out under a heavy acceleration load applied thereto without impairing the accuracy and reliability thereof under service conditions.

Various other objects, advantages and improvements will be apparent upon consideration of the following description taken in connection with the single figure of the annexed drawing in which is shown a sectional view of the switch indicated generally by the numeral 10 comprising a cup-shaped casing 11 having a cover 12 secured thereto in sealed relation as by welding the parts together. The casing is provided with a centrally located circular aperture 13 within which is fitted a bushing 14 carrying a threaded sleeve member 15 insulated therefrom as by the alumina bushing 16 illustrated. The outer portion of the bushing is provided with a terminal 17 having a flexible wire 18 connected thereto for establishing an external electrical circuit to the sleeve member 15. A hollow stud 21 is threaded within the sleeve member and provided with a vent 22 extending axially therethrough. The hollow stud 21 is provided with a flat circular head 23 to which is secured a pair of expansible bellows 24 sealed to an annular spacing member 25 at an outer cylindrical portion thereof substantially as shown. One of the bellows is provided with an aperture 26 therein in communication with aperture 22 for establishing a fluid connection from the interior of the bellows assembly to the ambient air. The other one of the pair of bellows is provided with an electrical contact 27 at the mid portion thereof.

The cover 12 threadedly supports a hollow stud 21 carrying a bellows assembly similar to the bellows 24 having the interior thereof in communication with the ambient air by way of aperture 22 within the stud in a manner similar to the first described bellows arrangement. The bellows is also provided with a contact 28 selectively engageable with contact 27 in accordance with the instant positions of the two pairs of bellows. The cover 12 is also provided with a terminal connection 29 having a flexible wire 31 connected thereto for establishing an external electrical connection to the contact 28. The bellows are composed of a metal or alloy having certain desirable characteristics, as for example, a metal capable of being welded and at the same time retaining a specific modular elasticity over a wide range of temperature, a metallic alloy sold under the trade name of Ni-Span C having been found to be suitable for the purpose. The foregoing arrangement, it will be understood, employs the detection of four sensing diaphragms to provide a maximum motion within the altitude range at which the switch is set to operate. The switch is initially adjusted by movement of the studs 21 within their respective threaded supporting members until a desired setting is obtained. A high degree of vacuum is obtained within casing 11 by any conventional means, not shown, preferably after the studs 21 are set to their adjusted position and the ambient pressure applied to the interior of each pair of bellows is reduced to a predetermined value corresponding to the ambient pressure at an altitude of 70-80 thousand feet above ground. The adjustment of the studs is such that contacts 27 and 28 open when the pressure within the pairs of bellows has been reduced to this value. The adjustment of the bellows assemblies is maintained by soldering the studs 21 to their respective supports in a manner to effect a hermetic seal therebetween.

The switch disclosed herein is well adapted to withstand a shock load of 250 G as the rocket motor is initiated for .08 second and later a space expulsion shock of 750 G reaching a peak value in 2 milliseconds without damage or injury. When factory adjustments have been completed, the switch is potted in a manner to leave the vents 22 exposed to the ambient pressure, the potting being such that several of the switches may be stacked or nested within a single rocket, if desired, to effect several circuit controls corresponding respectively to the different ambient pressures at which the respective switches are set to close their contacts.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

A modular barometric pressure switch comprising
a rigid cylindrical cup-like casing,
a cover having a terminal connection thereon, hermetically sealed to the open end of said casing,
a supporting stud secured to the bottom of said casing in alignment with the axis thereof and electrically insulated therefrom,
a second stud secured within the cover of said casing, separate from said terminal connection and in alignment with the first-named stud, each of said studs having an enlarged head,
an expansible bellows element carried by each of said enlarged heads on each of said studs within the casing, each of said bellows elements having a contact externally secured to a central portion thereof in mutually facing contact relation, each of said studs having an aperture therethrough for establishing fluid communication between the interior of the respective bellows elements and the ambient air, said studs being in threaded engagement with opposite end portions of said casing whereby said studs can be adjusted to an initial setting such that the contacts are closed by pressure of the ambient air normally applied thereto through said apertures and moved to an open position when the pressure applied to the interior of the bellows elements has been reduced to a predetermined value corresponding to a predetermined altitude above the earth,
and means for establishing an external electrical connection to said supporting stud.

References Cited by the Examiner

UNITED STATES PATENTS

| | | |
|---|---|---|
| 1,665,381 | 4/1928 | Siddall et al. |
| 2,943,167 | 6/1960 | Hughes et al. _____ 200—83 |

BERNARD A. GILHEANY, *Primary Examiner.*

H. M. FLECK, *Assistant Examiner.*